P. GENDRON.
Children's Carriages.
No. 150,022. Patented April 21, 1874.
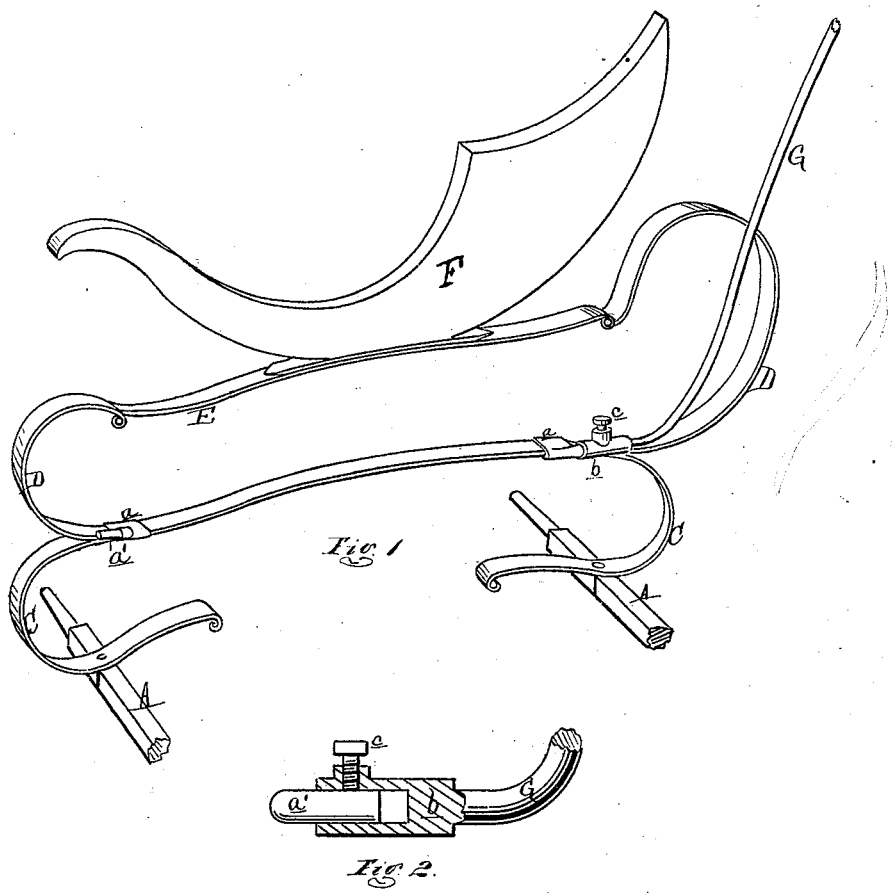

UNITED STATES PATENT OFFICE.

PETER GENDRON, OF TOLEDO, OHIO.

IMPROVEMENT IN CHILDREN'S CARRIAGES.

Specification forming part of Letters Patent No. 150,022, dated April 21, 1874; application filed August 11, 1873.

*To all whom it may concern:*

Be it known that I, PETER GENDRON, of Toledo, in the county of Lucas and State of Ohio, have invented a new and useful Improvement in Children's Carriages; and I do declare that the following is a true and accurate description thereof, reference being had to the accompanying drawings and to the letters of reference marked thereon, and being a part of this specification, in which—

Figure 1 is a perspective view, and Fig. 2 is a longitudinal section of the socket at the lower end of the handle.

Like letters refer to like parts in each figure.

The nature of this invention relates to an improvement in the construction of the running-gear of children's carriages, whereby a more elastic support is afforded to the body of the vehicle; and it also relates to a reversible propelling frame or handle, so arranged as to be attached to either end of the running-gear, in order that the vehicle may be propelled from either front or rear. The invention consists in the peculiar construction of the springs and perches which support the body, and in a reversible propelling-frame so arranged as to be attached to either end of the vehicle.

In the drawing, A A represent the axles of the vehicle, connected by a reach, B. C C are two C-springs, one of which is secured to each side of each axle, they also serving as perches for the long double C-springs D, whose upper ends are connected by either a leather or metallic thorough-brace, E, to which is attached the body F of the carriage. The long springs D are secured to the perch-springs C by clips $a$, each of which has a horizontal stud, $a'$, projecting from its inner edge. These studs project forward from the forward clips, and to the rear from the hind clips. G is the curved side bar of the propelling-frame, connected by a handle (not shown) at the upper end to a parallel bar. (Not shown). At the lower end of the handle is secured a socket, $b$, which may be slipped over the stud $a'$ at either end of the vehicle, and there be secured by a set-screw, $c$, tapped through the side of the socket to impinge against the stud; this enables the attendant to shift the propelling-frame to either end, so as to push or draw the vehicle, as may be desired, while the arrangement of the springs and elastic perches is such as to insure an easy and elastic support to the body with the employment of the least amount of metal.

What I claim as my invention, and desire to secure by Letters Patent, is—

1. The combination, with the axle A and box F, of the springs C and D, connected by the clips $a$ and the brace E, constructed substantially as set forth.

2. The combination of the propelling-bars G, having sockets $b$ and set-screw $c$, with the springs C D, having studs $a'$ and clips $a$, substantially as set forth.

PETER GENDRON.

Witnesses:
H. S. SPRAGUE,
THOS. S. DAY.